Nov. 22, 1966  C. E. WELLER ETAL  3,287,541
TEMPERATURE CONTROLLED SOLDERING IRON
Filed July 13, 1964  3 Sheets-Sheet 2
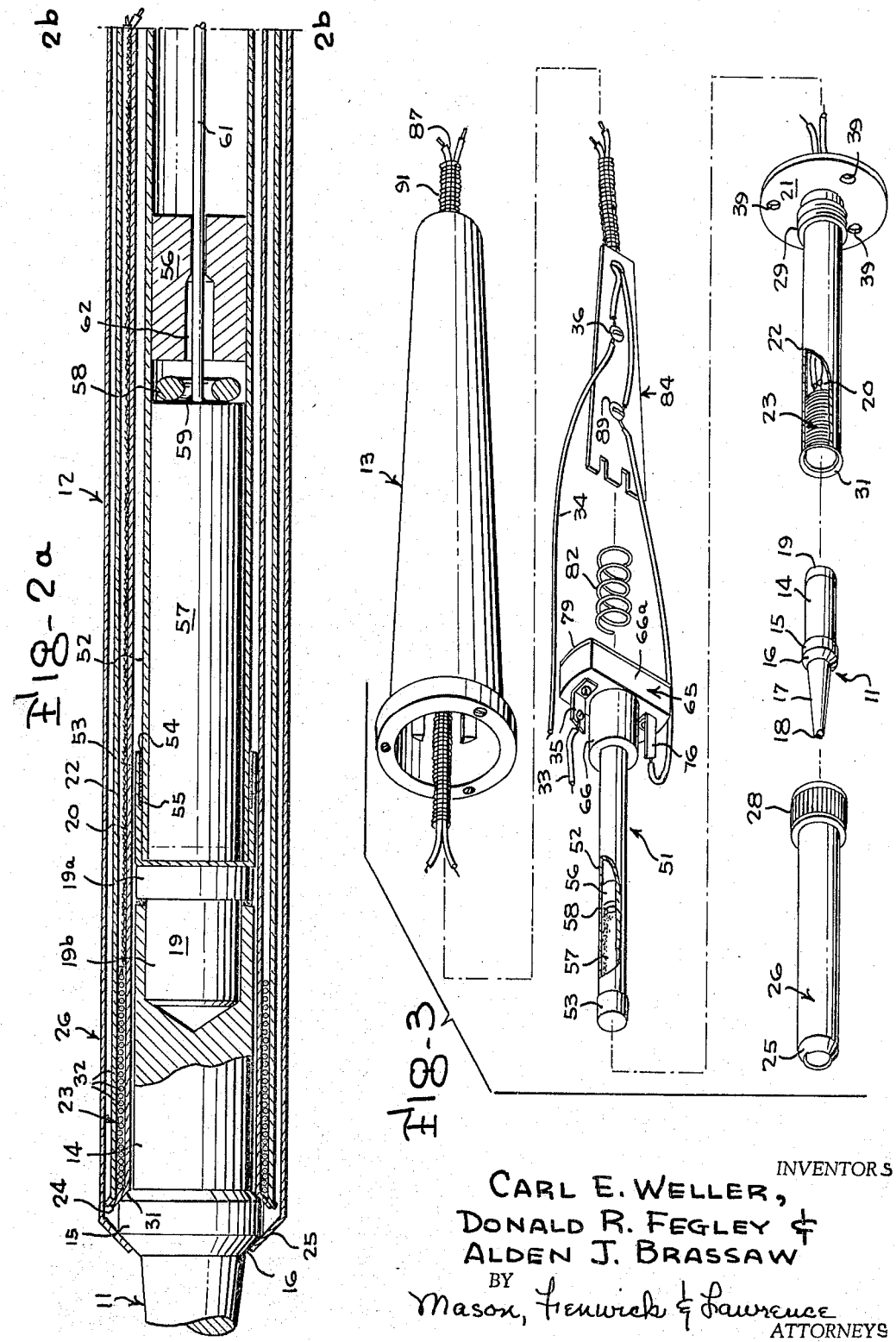
INVENTORS
CARL E. WELLER,
DONALD R. FEGLEY &
ALDEN J. BRASSAW
BY Mason, Fenwick & Lawrence
ATTORNEYS Nov. 22, 1966          C. E. WELLER ETAL          3,287,541
            TEMPERATURE CONTROLLED SOLDERING IRON
Filed July 13, 1964                         3 Sheets-Sheet 3
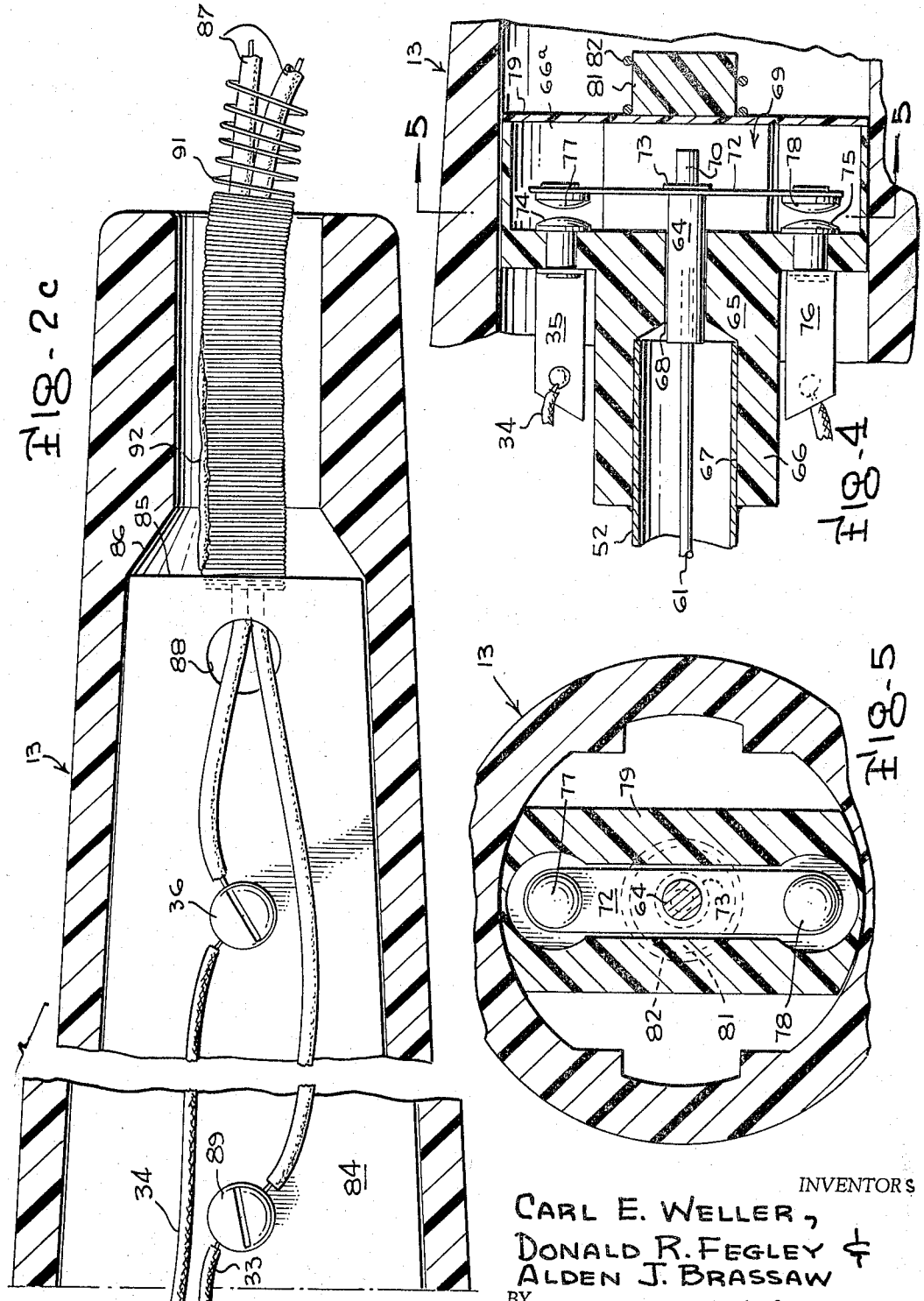
INVENTORS
CARL E. WELLER,
DONALD R. FEGLEY &
ALDEN J. BRASSAW
BY Mason, Fenwick & Lawrence
                    ATTORNEYS – # United States Patent Office 3,287,541
Patented Nov. 22, 1966

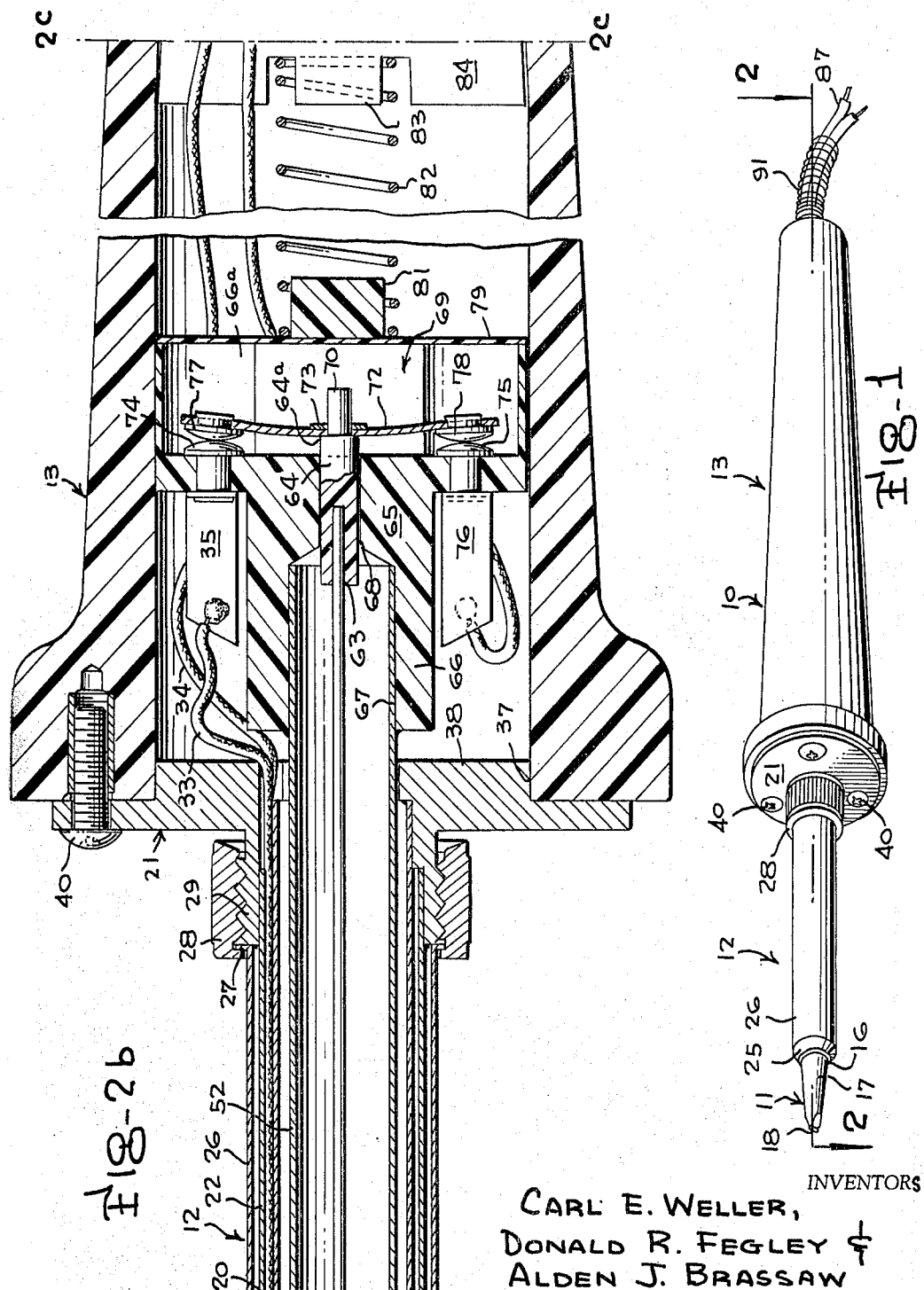

3,287,541
TEMPERATURE CONTROLLED SOLDERING IRON
Carl E. Weller and Donald R. Fegley, Easton, Pa., and Alden J. Brassaw, Phillipsburg, N.J., assignors to Weller Electric Corporation, Easton, Pa., a corporation of Pennsylvania
Filed July 13, 1964, Ser. No. 382,156
10 Claims. (Cl. 219—241)

This invention relates in general to electrically heated soldering irons and more particularly to electrically heated soldering irons having an automatic temperature regulating facility.

In the most common type of electrically heated soldering irons heretofore commercially produced, the top temperature is determined by heat dissipation to the air by radiation, conduction and convection. This type of soldering iron is specifically designed so that the heat losses through radiation and convection to ambient air are sufficient when the unloaded soldering tip reaches a desired idling temperature that they are equal to and therefore balance out any additional heat delivered to the soldering tip by the heating element establishing an equilibrium condition whereby no further increase in the temperature of the soldering tip occurs. Radiation and convection losses are built into this type of soldering iron by providing a large mass and thus a large radiating area to produce the desired quantity of heat loss for establishing the selected idling temperature. For example, conventional 55 watt soldering irons designed in this manner to have an idling temperature of about 650° F., would have a large shell surrounding the heating element and a large soldering tip to provide large radiating surfaces for dissipation of heat to the surrounding air. Such a tool will obviously have a high dissipation factor, meaning that the heating element is wasting a large portion of its heat, and of the input wattage, in heating the room and is producing little heat for the job of soldering. The heating element would, of course, remain seriously burdened by the necessity of supplying the heat for radiation and convection losses when the soldering tip is quickly sapped of its heat by contact with the work and thus be unable to effectively keep the tip temperature up to the values necessary for good soldering.

A soldering iron designed to be more efficient in supply of heat energy to the soldering tip may have an idling temperature of about 1000° F. and would have a reduced physical size and hence smaller radiation losses. Irons at these temperatures shown quick and rapid deterioration of the soldering tip, requiring very frequent replacement. Additionally, such high-idling-temperature soldering irons would require highly skilled operators to avoid damage to components in the work area of the iron and to achieve a reliable solder joint, since the tip temperature is so high above solder melting temperature that great care must be exercised to avoid any movement of the parts to be bonded by the solder during the long cooling period down to solder freezing temperature.

Further, soldering irons are normally constructed to operate on a voltage rating of approximately 120 volts or 220 volts, and as such require relatively light gauge heating windings that are of short life and high voltage requires thicker insulation to prevent leakage currents and resultant element burn out. The thicker insulation increases the diameter of the element and its cover, thus increasing radiant and convection losses and lowering the efficiency.

Efforts have been made to automatically regulate the input power of soldering irons responsive to the tip temperature to provide low idling temperature with reduced radiation loss, by using thermostatic devices to limit the top temperature of the soldering iron, such as bimetals, linear expansion devices, air thermometers and thermocouples. These, however, have been characterized by problems of instability, short life, excessive cost, or failure to meet the basic requirement of controlling the temperature of the tip when used in the act of soldering.

The earlier U.S. Patent No. 2,951,927 of Carl E. Weller, granted Sept. 6, 1960, discloses a soldering iron having a control element of temperature-sensitive ferromagnetic material and a movable magnet and switch mechanism for regulating input power in selected relation to tip temperature, which avoid the above-mentioned problems.

An object of the present invention is the provision of a novel electrically heated soldering iron having temperature regulating means therein for controlling the energization of the soldering iron heating element to establish a selected idling temperature for the tip dependent upon the control properties of the regulating means rather than the heat radiation losses from the tool.

Another object of the present invention is the provision of an electrically heated soldering iron having a thermomagnetic element responsive to the temperature of the soldering tip of a novel magnet and switch assembly for controlling the energization of the heating element.

Another object of the present invention is the provision of a novel electrically heated soldering iron having a mechanism therein for regulating the idling temperature of the tool which has stable regulating properties and reliable temperature regulation characteristics over a long period of time.

Another object of the present invention is the provision of a novel electrically heated soldering iron operable on low voltage thereby being of small size, economical to manufacture and of few parts.

Still another object of the present invention is the provision of a novel electrically heated soldering iron having a mechanism therein for regulating the idling temperature of the tool which operates on low voltage to provide superior efficiencies and safe operating characteristics.

Other objects, advantages and capabilities of the present invention will become apparent from the following detailed description, taken in conjunction with the accompanying drawings.

In the drawings:
FIGURE 1 is a perspective view of an electrically heated soldering iron embodying the present invention;
FIGURES 2a, 2b and 2c together constitute a fragmentary longitudinal section view of the soldering iron taken along line 2—2 of FIGURE 1, these figures being of considerably enlarged scale to facilitate illustration of the components of the soldering iron;
FIGURE 3 is an exploded perspective view of the elements of the soldering iron;
FIGURE 4 is a fragmentary section view similar to that of FIGURE 2b showing the elements of the control switch in circuit open condition; and
FIGURE 5 is a transverse section view taken along line 5—5 of FIGURE 4.

The present invention, in general, comprises a soldering iron having a soldering tip and an electrically energized heating element associated therewith to supply heat to the soldering tip. Temperature control for the tip of the tool is provided by an element made of temperature-sensitive ferromagnetic material having a Curie point in an appropriate temperature range, which hereinafter will be referred to as a "thermomagnetic material." The thermomagnetic material is disposed in intimate thermal contact with the soldering tip and additional means are provided to utilize the characteristic of this thermomagnetic material to be ordinarily magnetic (i.e. capable of attracting a magnet) and to become substantially nonmagnetic, or of reduced capacity to attract a magnet, when heated to a sufficiently high temperature by changes in temperature, for example about 700° F., which may be well below the idling temperature which would result if dependent entirely upon the radiation and convection losses designed into the tool. A specially designed and improved control switch assembly responsive to the temperature-related magnetic properties of the thermomagnetic control element is provided in a special way to insure reliable regulation of temperature while providing long switch life.

Referring to the drawings, wherein like reference characters designate corresponding parts throughout the several figures, the soldering iron, indicated generally by the reference numeral 10, includes a soldering tip 11 supported by an elongated barrel assembly 12 and a handle 13. The soldering tip 11 is, for example, formed of machined copper and then iron plated. Iron plating serves as a barrier against interchange of copper from the tip into solution with the molten solder.

The soldering tip 11, as illustrated in FIGURE 3, includes a cylindrical body portion 14 extending from the rear end thereof to a point near the longitudinal midpoint of the tip 11, there the tip 11 flares sharply outwardly to form a raised peripheral ring 15 about the tip body 14 and then tapers forwardly at 16 to a cone portion 17 that terminates in a chisel-shaped end 18. It should be understood, however, that the portion forward of the ring 15 may be of any configuration to suit the work.

A thermomagnetic control element 19, formed of a material which is normally magnetic and whose permeability is subject to substantial variation in relation to variation of the temperature to which it is exposed, is attached in good thermal communication with the rearmost portion of the soldering tip 11. In the present embodiment the thermomagnetic control element 19 has a larger diameter head portion 19a which corresponds to the larger end diameter 14 of the soldering tip 11 and a constricted shank portion 19b tightly fitted in a complemental bore in the rear end of body portion 14 of the tip 11.

The elongated barrel assembly 12 comprises an inner tubular member 20, which hereinafter will be termed the "element spool," in surrounding relationship with the soldering tip 11, which fits within the bore of the element spool 20 in a snug fitting relationship that provides good thermal communication between the element spool 20 and the soldering tip 11. As can be seen in FIGURE 2b, the element spool extends longitudinally rearwardly and terminates within handle cover flange, generally indicated by the reference numeral 21.

A second tubular member, which will hereinafter be termed the "element cover tube" and indicated by reference character 22, forms in conjunction with element spool 20, a concentric hollow annular space in which the heating element 23 and associated leads are placed. Element spool 20 and cover tube 22 each have forward ends that are flared outwardly and are joined at 24 to enclose the annular space therebetween. Cover tube 22 extends rearwardly and terminates in handle cover flange 21 and is preferably secured therein by a suitable epoxy adhesive thereby forming a unitary tubular structure for accepting and positioning tip 11 within the inner bore of element spool 20 in good thermal relation with heating element 23. The element spool 20 and element cover tube 22 are preferably formed of stainless steel to provide increased life.

Tip 11 is properly positioned with the inner bore of element spool 20 by engagement of the inwardly extending tapered flange 25 of draw tube 26 with the tip peripheral ring forward taper 16. Located at the remote rear end of draw tube 26, and held thereto by peripheral flange 27, is a freely rotatable threaded nut 28 adapted to be threaded about nut receiving stud 29 of cover flange 21 to draw the tip 11 into proper engagement with the flared end 31 of element spool 20 at such time as nut 28 is completely engaged with stud 29. The arrangement of having nut 28 at the rear of draw tube 26 permits the heating element 23 to be closer and more intimately associated with the working end of the tip 11 and allows the body portion 14 to be substantially reduced in size than would be the case if the nut 28 were positioned at the forwardmost end of the barrel assembly. Further, by gently drawing the tip 11 into engagement with the inner bore of element spool 20 there is no possibility of a biting or wiping action on the tip coating by rotating the nut therearound.

The annular chamber formed between the concentric element spool 20 and cover tube 22 is occupied by the heating element 23 of the soldering iron which may be formed in any manner, but is here illustrated as being wound in a single layer upon the element spool 20 as indicated by reference numeral 32. These windings are wound from a continuous length of resistance wire in a bifilar manner so that the current flowing in adjacent wires is in opposite directions in order to produce a cancellation of flux and form a non-inductive winding. Since the soldering iron of the present invention is to be used on low voltage, for example 24 volts, leakage currents and voltages at the tip are reduced and operator safety is improved. Due to the low voltage the heating element 23 need not to be extensive in the number of turns or in the depth of the winding in order to produce the desired high heating for transfer to the closely related soldering tip 11.

The external leads 33, 34 from the heating element may be composed of a heat resistant conductor that is silver soldered or welded to the terminals of the heating element. The leads extend from the heating element 23 through the longitudinal length of the barrel assembly 12, and more specifically through the annular chamber formed by element spool 20 and cover tube 22, and through a keyway or key in the handle cover flange 21 into the interior of handle 13 where lead 33 terminates at solder lug 35 and lead 34 terminates at screw post 36.

The plastic handle 13 is preferably formed of a molded plastic material having a unitary truncated cone shape open at opposite ends and having an open bore throughout its length. The forward end portion of handle 13 is shaped to provide a cylindrical opening 37 into which boss portion 38 of cover flange 21 is adapted to be received in a snug fitting relation. A plurality of apertures 39 are provided about the cover flange which are adapted to receive suitable fasteners 40 to secure the barrel assembly to the handle 13.

An especially novel feature of the soldering iron is the temperature regulating switch sub-assembly, generally indicated by reference character 51, which is constructed so that it can be completely assembled as a separate unit and adjusted and then be installed in the element spool 20 and in the handle 13. Further, the switch sub-assembly, as a completely assembled unit can be readily substituted for a defective unit if the need should arise. The switch sub-assembly 51 includes an elongated stainless steel sleeve guide tube 52 having a non-magnetic thermal bushing 53 forming a forward closure for the guide tube 52 and securely adhered to the sleeve by a suitable adhesive 54 placed between guide tube 52 and the counter bored portion 55 of the thermal bushing 53. In the exemplary 40 watt soldering iron described in this application the guide tube 52 may have a length of about 2.125 inches. A magnetic bushing 56 formed of cold drawn or cold rolled steel is located within guide tube 52 rearwardly of the thermal bushing and held against displacement by suitable spot-welding methods which inetgrally unite the magnetic bushing 56 to the interior bore of guide tube 52. It is contemplated that in the present 40 watt soldering iron the thermal bushing may have a length of about .218 inch. Between the thermal bushing 53 and the magnetic bushing 56 is a cylindrical permanent magnet 57, for example having a length of about .875 inch, preferably cast from "Alinco V," which is slidably supported within guide tube 52 and adapted for movement between the thermal bushing 53 and the magnetic bushing 56.

Freely within the space between permanent magnet 57 and magnetic bushing 56 is a non-magnetic split-ring spacer 58 having an ovel cross section and a central aperture 59 therein. The purpose of the spacer 58 will be later described. Flash welded to the rear-end of magnet 57 is a connecting member or rod 61, that extends from the magnet 57 through the aperture 59 of spacer 58 and the central aperture 62 of bushing 56 to lodge in a tight fitting relationship within the bore 63 of an insulator 64.

Enclosing the switching mechanism of the present invention is a switch housing 65 preferably formed of a plastic material having a T shape wherein the circular projecting center leg 66 encloses the posterior portion of guide tube 52 in a central bore 67 in which the tube 52 is inserted and adjusted to an appropriate depth and secured thereto by a suitable adhesive. Transverse to the center leg 66 is the cross leg of the T indicated by numeral 66a. The insulator 64, in which the rear-end of connecting rod 61 is secured, is slidably received within the constricted aperture 68 of the center leg 66 and projects into the main housing recess 69 wherein the projecting nib 70 of reduced diameter is inserted through a center aperture of shorting bridge 72 and suitable speed nut 73 or other suitable fastener would be placed over nib 70 and positioned adjacent the rear face of shorting bridge 72, whereby bridge 72 is placed adjacent flange stop 64a that delineates the constricted diameter of the nib 70 from the main diameter of the insulator 64. Such a construction allows speed nut 73 to frictionally engage nib 70 and fixedly position shorting bridge 72 in the desired placement. Mounted through the anterior face of switch housing 65 and flanking center leg 66 are stationary contacts 74, 75 electrically and physically connected to solder lugs 35 and 76 respectively. Mounted through the remote ends of the shorting bridge 72 and facing stationary contacts 74, 75 are contact buttons 77, 78 which provide the switch contacts for regulating current flow to the heater element 23. Enclosing the rear of the switch housing is housing cover 79 from which there extends rearwardly from the center thereof a forward spring support 81 adapted to receive about its periphery the forward end of coil spring 82 which has its rear end mounted about rear spring support 83 of fiber terminal panel 84. It is to be noted from FIGURE 2c that terminal panel 84 is of a trapezoidal shape in which the rear edge 85 of the panel rests against handle 13 at the constricted end of the handle bore indicated by numeral 86 which prevents movement of the terminal panel in a rearward manner. Coil spring 82 maintains forward pressure upon the posterior face of housing cover 79 for the purpose of seating the switch sub-assembly 51 in close contact with the tip 11, and especially to maintain the thermal bushing 53 bottomed against the thermomagnetic control element 19 whereby the optimum magnetic attraction is attained between the element 19 and permanent magnet 57.

For supplying the soldering iron with an electric current, input cord 87 enters the handle 13 in a co-axial manner and passes through restraining aperture 88 in panel 84 that acts to prevent the input leads or cord 87 from being withdrawn from the handle 13 upon an undue strain being put upon the cord. The individual leads of cord 87 then terminate on the terminal panel 84 at screw posts 36 and 89 which electrically interconnect the input lead or cord 87 with the heating element lead 34 and through the switch mechanism with lead 33, respectively. It should be noted that the cord 87 is completely encircled by a protective coil spring 91 that protects the cord against being damaged from accidental contact with heated parts of the tool or abrasive surfaces and restricts bending of the conductors to prevent their embrittlement and breakage. As the cord and spring enter the handle 13 the coil spring 91 is coiled in a close and tight coil and cemented, as indicated by numeral 92, in bottomed relation to the handle 13 in order that the spring may not be removed therefrom.

It is well known that various magnetic metals have different values of permeability, and in the present invention it is desired to have the thermomagnetic control element 19 and the magnetic bushing 56 made of metals that have relatively high ambient permeabilities in order that the magnet 57 will always have a high initial attractive force between one or the other of the two magnetic materials. It is seen that the rear face of the control element 19 has a substantially greater area facing toward the magnet 57 than does the forward face of the magnetic bushing 56. This is important because it is desired that the control element 19 have a greater magnetic attractive force than the magnetic bushing 56 in order that the control element 19 will always exert a greater magnetic attraction to the magnet 57 than the magnetic bushing 56 during the time when the temperature of the control element 19 is below the temperaure at which it is desired to automatically open the switch, which will be hereinafter referred to as the "control point." As was previously mentioned, there is positioned between magnet 57 and bushing 56 a non-magnetic spacer 58 to control the minimum distance, and the effective flux density, between the magnet 57 and the magnetic bushing 56, thereby controlling the maximum magnetic attraction between the magnet 57 and the magnetic bushing 56. It is contemplated that the spacer 58 should have an axial thickness, in the present embodiment, of about .040 inch.

The thermomagnetic control element 19 is formed of a material which loses its permeability to a sufficient degree to permit the magnetic bushing 56 to draw the magnet 57 from its forwardmost position to a position in which it butts against the forward face of the non-magnetic spacer 58, thereby opening the contacts 74, 77 and 75, 78 of the switch and breaking the heating element supply circuit, at a selected temperature level, to begin switching the heating element 23 between an "on" or heating phase and an "off" or de-energized phase. In practice, a number of different tips may be provided for the tool each having a control element 19 selected to provide a different regulated temperature range from the other tips. For each temperature range, the control point temperature of the element 19 at which switching between "on" and "off" phases begins should be located near the upper limit of the regulated temperature range for the tip so that the tip temperature when the iron is working on soldering loads remains within the selected range for the tip. In this manner, control of the working temperature of the soldering tip can be achieved to give a reliable solder joint and freedom from the possibility of damage to the soldered components due to overheating. A thermomagnetic material should, therefore, be chosen for each tip which will so reduce the magnetic force on the magnet 57 as to cause the magnetic bushing 56 to draw the magnet away from the soldering tip, thereby opening the switch contacts, preferably near the upper limits of the designated temperature range for that tip. While some flexibility may be exercised within the skill of the metallurgical and allied arts in the selection of a specific thermomagnetic material for the control elements, materials such as Monimax, produced by Allegheny-Ludlum Steel Corp. (48% nickel, 3% molybdenum, remainder iron), or nickel-iron alloys having about 43% substantially pure nickel and the balance of iron may be used. It is important, however, that the traces of other elements in the nickel constituent of such a nickel-iron alloy which may affect the permeability or other properties, such as carbon, sulphur and oxygen, not exceed such limits as to significantly alter the thermomagnetic properties.

When the temperature of the soldering tip 11 is above the control point, the thermomagnetic control element 19 loses its permeability and eliminates the magnetic attraction between magnet 57 and the control element, which then in turn means that the magnetic attraction between magnet 57 and bushing 56 is sufficient to move the magnet rearwardly and carry spacer 58 to a point adjacent bushing 56. In this position the connecting rod 61 with its associated insulator 64 is in its most rearward limit position, as is shown in FIGURE 4. In moving rearwardly the connection rod 61 forces the flange stop 64a to exert a rearward force on shorting bridge 72 which opens contact points 74, 77 and 75, 78 and continues to move the shorting bridge out of contact position until magnet 57 has reached its rear limit position. At this point no current is flowing to the heating element 23, thereby allowing tip 11 to cool and to permit control element 19 to regain its permeability.

When the temperature of the soldering tip 11 falls below the control point the magnetic force between magnet 57 and control element 19, which has regained its permeability, exceeds the attractive force of bushing 56 for magnet 57 and moves the switch to a closed position. The only forces acting upon connecting rod 61 to return the shorting bridge 72 to a switch closed position in the magnetic attraction between magnet 57 and control element 19 which is substantially greater than the attraction of bushing 56 for the magnet. Therefore, it is easily seen that whenever control element 19 has its normal degree of permeability magnet 57 will rest in its most forward position thereby allowing current to flow to the heating element 23. The stroke of the magnet 57 from its rearward most position against the non-magnetic spacer 58 to its forward limit position against the thermal bushing 53 is approximately .014 inch.

Upon movement of shorting bridge 72 approximately .008 inch from its open limit position contact buttons 77, 78 engage stationary contacts 74, 75. At this point the shortening bridge 72 begins to achieve a bowed configuration as seen in FIGURE 2b and offers a resistive force to the forward movement of connecting rod 61 and consequently magnet 57, which force is, however, readily overcome by the superior attractive force of magnet 57 for control element 19. It will be noticed that the moving contact buttons 77, 78 move in an arc throughout the entire overtravel portion of opening and closing movement when the buttons and contacts are in engagement with each other because of the manner in which shorting bridge 72 is centrally supported by insulator 64.

Due to the above mentioned arcuate movement a relative motion between the moving contact buttons 77, 78 and the stationary contact buttons 74, 75 takes place. Because of this relative motion a wiping action is initiated at the bases of the contact buttons that serves to break any weld which may have formed between the contact buttons.

Thus it can easily be seen that the relative locations of the control element 19 and bushing 56, and thier configuration and properties, must be selected in such a manner that the tractive force between magnet 57 and control element 19 when the temperature of the latter falls below the desired control poinnt is in excess of the tractive force the magnet has for bushing 56. At all times when the control element 19 has its full value of permeability the magnet 57 will be in its forward limit position against thermal bushing 53. However, when the control element 19 increases in temperature to a point that lowers the tractive force between control element 19 and magnet to a value less than the tractive force between bushing 56 and the magnet, the magnet moves toward bushing 56 causing connecting rod 61 to move shorting bridge 72 and its associated contact buttons 77, 78 away from the stationary contacts 74, 75 causing the interruption of current to heating element 23.

It will be recognized that uncontrolled soldering irons, wherein the heating element is always operating at full capacity and radiation and convection losses are relied upon to establish an idling temperature, experience a drastic reduction in temperature when the tip is loaded by work as the radiation and convection losses, which must be supplied by the heating element, continue. Unlike such uncontrolled soldering irons, the present soldering iron temperature is maintained within a narrow range of the optimum soldering temperature. When the soldering iron is at unloaded idling temperature the automatic temperature regulating facility energizes the heating element during a relatively short proportion of the time. The radiation losses are exceedingly small because of the small size and design of the tool, and the reduction in temperature of the tip when it becomes loaded increases the proportional time that the heating element is energized to supply greater heating to the soldering tip and thereby maintain the soldering tip in the desired temperature range.

The heating element 23 of the present invention is preferably wound so as to provide a non-inductive windings, to avoid deposits which would shorten switch life. If the winding were inductive, its field would aid and oppose the holding action between the magnet 57 and thermomagnetic control element 19 on successive half cycles. This would cause the contacts 74, 77 and 75, 78 to break at the peak of the current wave in the "oppose" direction. This is the worst possible time and direction of current flow is always the same, leading to unidirectional metal transfer in one direction as with D.C. circuit. If a non-inductive winding is used this field is negligibly small and break point is truly random, occurring in either half cycle and not necessarily at a current maximum. Hence deterioration of the contact points is less.

The soldering iron referred to as the 40 watt is constructed in such a way that it is readily adapted to permit interchangeable soldering tips having different control points to be used in the iron. Since the thermomagnetic element is preassembled with the soldering tips at the factory and this soldering tip and control element unit is readily removable from the iron, the user may have a plurality of different soldering tips for each soldering iron, which have different control points as determined by the thermomagnetic element provided in the tip, for example, one 500° F. control point tip, one 600° F. control point tip and one 700° F. control point tip, so that the user may readily assemble the tip having the desired control point with the iron to suit the particular work conditions with which he is faced.

By the construction and arrangement of the switch, magnet and guide tube as an unitary sub-assembly, wherein the switch components are completely assembled within housing 65, a particularly convenient arrangement for manufacture is provided as the switch parts may be assembled in the housing 65 externally of the handle before introduction of the switch assembly in the handle. Further, by providing the unitary switch and guide tube sub-assembly 51 which is located in the element spool 20 and handle in axially slideable relation, and which is connected to the handle only by spring 82, "a floating switch" and guide tube arrangement is provided. Thus, when the switch and guide tube sub-assembly is mounted in the handle and barrel components of the tool, and a tip 11 is inserted into the bore of the element spool 20, the floating switch and guide tube sub-assembly is free to move rearwardly against the biasing action of the spring 82 when contacted by the control element 19 carried by the tip 11.

This capacity of the switch and guide tube sub-assembly to resiliently yield rearwardly of the the iron provides distinct advantage over systems wherein the guide tube and the closure bushing at the forward end thereof are rigidly fixed in the soldering iron. Such a "floating switch" arrangement accommodates variations in location of the inner end of the control element in the replacement tips arising from manufacturing tolerances or differences in the force applied by the user when mounting the replaceable tip in the iron. Further, the floating arrangement and the freely supported and normally non-rotative drawtube 26 avoids damage to the thermal bushing 53 which might otherwise arise if any dirt or foreign matter were deposited on the inner surface of the control element when the tip is inserted, as the sub-assembly supporting the thermal bushing will yield toward the handle end of the tube and prevent the foreign matter from being ground into the thermal bushing upon tightening of the drawtube nut 28 which engages tapered flange 25 with tip taper 16 and gently moves tip 11 into seating engagement with thermal bushing 53.

While we have particularly shown and described one particular embodiment of the invention, it is distinctly understood that the invention is not limited thereto but that modifications may be made within the scope of the invention and such variations as are covered by the scope of the appended claims.

What is claimed is:

1. An electric soldering iron having a soldering tip, a thermomagnetic element positioned to be heated in response to the temperature of the tip, an electric heating element in thermal communication with the tip, the improvement of a control sub-assembly for regulating current supplied to the heating element comprising, a non-magnetic elongated guide tube having an end adapted to be located adjacent the thermomagnetic element, a magnet slidably disposed in the tube adjacent the end, the thermomagnetic control element having a permeability which varies upon variation of its temperature to provide a magnetic force between the magnet and the thermomagnetic control element which diminishes as the temperature of the thermomagnetic control element increases, stationary magnetic means fixed in the tube for withdrawing the magnet through a selected stroke away from the thermomagnetic element by magnetic attraction of the magnet therefor when the temperature of the thermomagnetic element surpasses a selected value, an integral substantially T shaped switch housing mounted on the guide tube at one end thereof remote from the thermomagnetic element, switching means disposed in the switch housing having a movable contact member, an elongated connecting member extending between the magnet and the movable contact member for moving the latter in selected relation to movement of the magnet, the means for withdrawing said magnet through a selected stroke comprising a magnetic bushing longitudinally apertured to accommodate the elongated member therethrough and of generally cylindrical shape conforming substantially to the internal diameter of the guide tube whereby when the magnet slidably withdraws through a selected stroke current is interrupted to the heating element.

2. An electric soldering iron according to claim 1, wherein the movable contact member is fixedly mounted upon the elongated connecting member and movable therewith between a circuit opening position and a circuit closing position.

3. An electric soldering iron having a handle, a soldering tip, a thermomagnetic control element positioned to be heated in response to the temperature of the tip, an electric heating element in thermal communication with the tip, the improvement of a control sub-assembly for regulating current supplied to the heating element comprising, a generally cylindrical magnet supported for movement relative to the thermo-magnetic control element, a seating bore in the soldering tip for positioning the thermomagnetic control element at the rearmost end of the tip in thermal contact with the soldering tip, the thermomagnetic control element having a permeability which varies upon variation of its temperature to provide a magnetic force between the magnet and the thermomagnetic control element which diminishes as the temperature of the thermomagnetic control element increases, a non-magnetic thermal bushing in intimate contact with thermomagnetic control element, an elongated, cylindrical, thin-walled, non-magnetic guide tube in communication with the thermal bushing for guiding the magnet in axial reciprocation along the axis of the guide tube between a first position immediately adjacent the thermal bushing to a second position rearwardly therefrom, stationary magnetic means for withdrawing the magnet through a selected stroke away from the thermomagnetic element when the temperature of the latter surpasses a selected value, said means comprising a magnetic bushing longitudinally apertured and of generally cylindrical shape conforming substantially to the internal diameter of and fixed in the guide tube, and a switch operated by the movement of the magnet toward and away from the thermo-magnetic control element for regulating energizing current supplied to said heating element including an integral switch housing mounted on the guide tube at one end thereof remote from the thermomagnetic element, stationary contact means embedded in the housing, movable contact means disposed in the switch housing and coupled to the magnet for operation thereby to cooperate with the stationary contact means to complete an electrical circuit.

4. An electric soldering iron according to claim 3, wherein the swtich housing has a T shaped configuration comprising a center leg and a cross leg transverse to the center leg, the center leg being longitudinally apertured and adapted for receiving the guide tube in a fixed relation and the cross leg having a hollow chamber therein.

5. An electric soldering iron according to claim 4, the switch further including an elongated connecting member extending between the magnet and the movable contact member, one end of the connecting member being fixed to the magnet, the other end of the connecting member being reciprocatively disposed in the longitudinal aperture of the center leg and extending into the cross leg hollow chamber.

6. An electric soldering iron according to claim 5, wherein the stationary contact means comprise a pair of contact members each communicating between the cross leg hollow chamber and the exterior thereof, the movable contact means comprising an elongated flexible shorting bridge centrally affixed to the connecting member, and contact buttons mounted at opposed ends of the shorting bridge adapted to register with the stationary contact means.

7. An electric soldering iron according to claim 3, the combination including a terminal panel disposed in the handle, a compression spring having one end coupled to the posterior of the switch housing, and the other end disposed about the terminal panel to resiliently bias the the control sub-assembly axially of the guide tube against the thermomagnetic control element.

8. In a thermally operated heating apparatus having a handle, heat transfer means, an electric heating winding in thermal communication with the heat transfer means, and a thermomagnetic control element positioned to be heated in response to the temperature of the heat transfer means; the improvement of a control sub-assembly for regulating current supplied to the heating winding comprising, a hollow switch housing having an anterior face and a posterior face, a centrally apertured support member projecting fom the anterior face, an elongated guide tube having one end portion adapted to be located adjacent the thermomagnetic control element and the other end rigidly fixed in the aperture of the support member, a pair of stationary contact means flanking the support member and projecting through the anterior face of the housing in communication with the interior thereof, an elongated centrally apertured shorting bridge disposed within the housing, a flexible intermediate zone located in the central region of the shorting bridge and contact buttons mounted at opposed ends of the shorting bridge and adapted to register with the stationary contact means, means located within the guide tube and fixed to the shorting bridge and responsive to the temperature of the thermomagnetic control element for selectively moving the shorting bridge relative to the stationary contact means for controlling the current supplied to the heating winding.

9. A thermally operated heating apparatus according to claim 6, wherein the magnet and connecting member having a selected range of travel upon movement of the magnet toward the control element to cause the shorting bridge to bow in the intermediate zone thereof to provide wiping action between the contact buttons and stationary contact means.

10. An electric soldering iron comprising, a handle of truncated hollow cone configuration, a centrally apertured cover plate fixed to one end of the handle, the cover plate having a threaded centrally apertured nut-receiving stud in registry with the aperture of the cover plate projecting from the anterior face of the cover plate, an elongated element spool having one end mounted in the central aperture of the cover plate, an electric heating element positioned on the element spool, an element cover tube concentrically disposed about the element spool to cover the heating element and terminating in the stud of the cover plate, an elongated soldering tip adapted to be partially disposed in the internal bore of the element spool, a raised peripheral ring about the mid portion of the soldering tip having an anterior face and a posterior face, the posterior face adapted to be disposed adjacent the free end of the element spool, a draw tube concentrically encircling the element cover tube, a peripheral flange at one end of the draw tube extending at right angles thereto and adapted to abut the stud, an inwardly extending tapered flange at the other end of the draw tube adapted to contact the anterior face of the soldering tip peripheral ring, a draw tube nut rotatably mounted about the draw tube peripheral flange to threadingly engage the nut receiving stud whereby upon full engagement of the draw tube nut with the stud the draw tube tapered flange bears against the anterior face of the tip peripheral ring and seats the tip within the bore of the element spool.

References Cited by the Examiner
UNITED STATES PATENTS

| | | | |
|---|---|---|---|
| 2,951,927 | 9/1960 | Weller | 219—241 |
| 3,188,448 | 6/1965 | Weller | 219—241 |

ANTHONY BARTIS, *Primary Examiner.*